United States Patent [19]

Stephens

[11] 4,063,307
[45] Dec. 13, 1977

[54] DIRECT CURRENT POWER CONVERTER WITH START-UP AND PROTECTION CIRCUITS

[75] Inventor: Dennis L. Stephens, Niles, Ill.

[73] Assignee: Teletype Corporation, Skokie, Ill.

[21] Appl. No.: 700,376

[22] Filed: June 28, 1976

[51] Int. Cl.² .......................................... H02P 13/22
[52] U.S. Cl. ...................................... 363/21; 363/49; 363/56
[58] Field of Search ............... 321/2, 14; 323/DIG. 1; 363/21 (U.S. only), 49 (U.S. only), 56 (U.S. only)

[56] References Cited

U.S. PATENT DOCUMENTS

| | | | |
|---|---|---|---|
| 3,419,781 | 12/1968 | Jullien-Davin et al. | 321/2 |
| 3,523,235 | 8/1970 | Schaefer | 321/2 |
| 3,562,668 | 2/1971 | Bartlett et al. | 321/2 |
| 3,843,919 | 10/1974 | Yamamura et al. | 321/2 |
| 3,849,716 | 11/1974 | DeBerg et al. | 323/DIG. 1 |
| 3,879,647 | 4/1975 | Hamilton et al. | 321/14 |

FOREIGN PATENT DOCUMENTS 2,410,915   9/1975   Germany .................................. 321/2

OTHER PUBLICATIONS

IEEE Transactions on Industry Applications, vol. IA-8, No. 6, "A Hybrid Integrated PWM," Nov./Dec. 1972.

Primary Examiner—William H. Beha, Jr.
Attorney, Agent, or Firm—W. K. Serp; J. C. Albrecht

[57] ABSTRACT

A D.C. to D.C. converter including a start circuit having a choke with a primary winding and a start winding. A portion of the input power is fed through a section of the start winding to the base of a switching transistor connected in series with the primary winding. The transistor is operated as a blocking oscillator by the start circuit and a voltage is induced across a secondary winding of the choke. The secondary voltage is rectified and fed to the control input of a pulse width modulator. In response to a predetermined level of the secondary voltage, the output of the pulse width modulator is coupled to the base of the transistor and the start circuit disabled. Current overload and transient voltage protection circuits are also included.

11 Claims, 2 Drawing Figures

DIRECT CURRENT POWER CONVERTER WITH START-UP AND PROTECTION CIRCUITS

BACKGROUND

This invention generally relates to a direct current to direct current power converter and more particularly to such a converter having improved start and overload characteristics.

Generally, D.C. to D.C power converters have produced selected voltage and power levels by interrupting the incoming current by means of a pair of push-pull switching transistors. In such systems, a commercial power source is rectified and filtered. The filtered D.C. is fed to the switching transitors and raised to the desired level by a suitable transformer. To obtain adequate ripple reduction the rectified output voltage from the transformer generally includes a smoothing choke. Therefore, the cost and complexity of such systems is relatively high if considerable power levels are to be obtained. One such switching converter is described in U.S. Pat. No. 3,843,919 entitled "DC-TO-DC Converter" issued Oct. 22, 1974 to Yamamura et al.

For the purpose of reducing system weight, energy storage converters incorporating a single switching transistor and an air gap multiwinding choke have been suggested. As a result of the high impedance coupling between the switching and output circuits, capacitive filtering may be used, thus eliminating bulky smoothing inductors for output filtering. However, such converters are not generally self-starting and therefore use a separately powered self-starting circuit including a pulse-width modulator. The pulse duration from the modulator is determined by the level of the output voltage from the converter. Prior to the converter reaching normal operating conditions, the power to the pulse-width modulator is generally supplied by a separate power supply operating from the alternating current source and including a step down transformer, rectifier, and filter. It will be appreciated that this starting power supply substantially increases the cost and weight of the converter. The illustrated embodiment utilizes a unique self-starting feature which allows starting of the converter without the necessity of providing a separate power supply for the start circuit.

The use of solid state devices for converter switching elements places a heavy burden on such devices which are sensitive to transient overvoltage and peak current conditions which may quickly destroy the devices. Prior converter systems have generally utilized transistors having parameters considerably in excess of those necessary to sustain normal operation so that transient conditions will be safely handled. Such an approach is costly and often increases the physical size of the cnverter due to the incorporation of overrated components. The illustrated embodiment includes means for protecting the switching device in the event of an overload condition thereby allowing its capacity to be determined by normal operating conditions rather than transient situations.

As previously mentioned, the direct current input to the converter is often provided by rectifying and filtering a commercial power source. In such arrangements, a common ground often exists between the output of the converter and the commercial power source creating an undesirable personnel hazard and potential noise source. The illustrated embodiment provides direct current isolation between the input and output terminals of the converter thus allowing the use of a commercial power source without the aforementioned disadvantages.

SUMMARY

A D.C. to D.C. converter which includes a start circuit for initiating operation of the converter upon application of the direct current input. The circuit includes a choke having a primary inductance, a start inductance and at least one secondary inductance with all inductances being magnetically coupled. A switching means is included having a control terminal for switching the D.C. input through the primary inductance. The start circuit includes means for passing at least a portion of the D.C. inut and at least a portion of the start inductance to the control terminal of the switching means. Additionally, means are included for rectifying the voltage across the secondary inductance so as to provide the desired D.C. output. The primary and start inductances are coupled so that the rate of voltage change across the primary created by the switching of current therethrough is reflected across the start inductance to the control terminal of the switching means causing the switching means to intermittently interrupt current through said primary inductance in response to the application of the D.C. input.

The switching means is in the form of a transistor with the base thereof corresponding to the control terminal. A pulse generator responsive to the voltage across the secondary inductance serves to provide a pulsed signal to the control terminal of the switching means in response to a predetermined condition of the voltage across the secondary. Means are provided for disabling the start circuit upon actuation of the pulse generator so that the start circuit controls the switching means upon the initial application of power to the converter and the pulse generator serves to control subsequent operation.

The apparatus additionally includes means responsive to a predetermined current level through the transistor for turning off the switching transistor in response thereto so as to prevent the conduction of excessive current through the transistor. Additionally, included are means responsive to the input voltage for turning off the transistor when the input voltage exceeds a predetermined level so as to protect the switching transistor from potentially destructive voltage transients.

A method is described for converting a direct current at a first voltage level to a second predetermined direct current voltage level by interrupting the input current through a primary inductance magnetically coupled to a start inductance wherein the voltage induced in said start inductance conducts the rate at which the current is interrupted through the primary inductance. The step of rectifying the output voltage across a secondary inductance coupled to the primary inductance is set forth as well as generating a pulsed signal related to the rectified output voltage from the secondary inductance. And finally, controlling the amount of current flow through the primary inductance with a pulsed signal when the voltage across the secondary inductance reaches a predetermined level.

DETAILED DESCRIPTION
GENERAL

Figure 1:
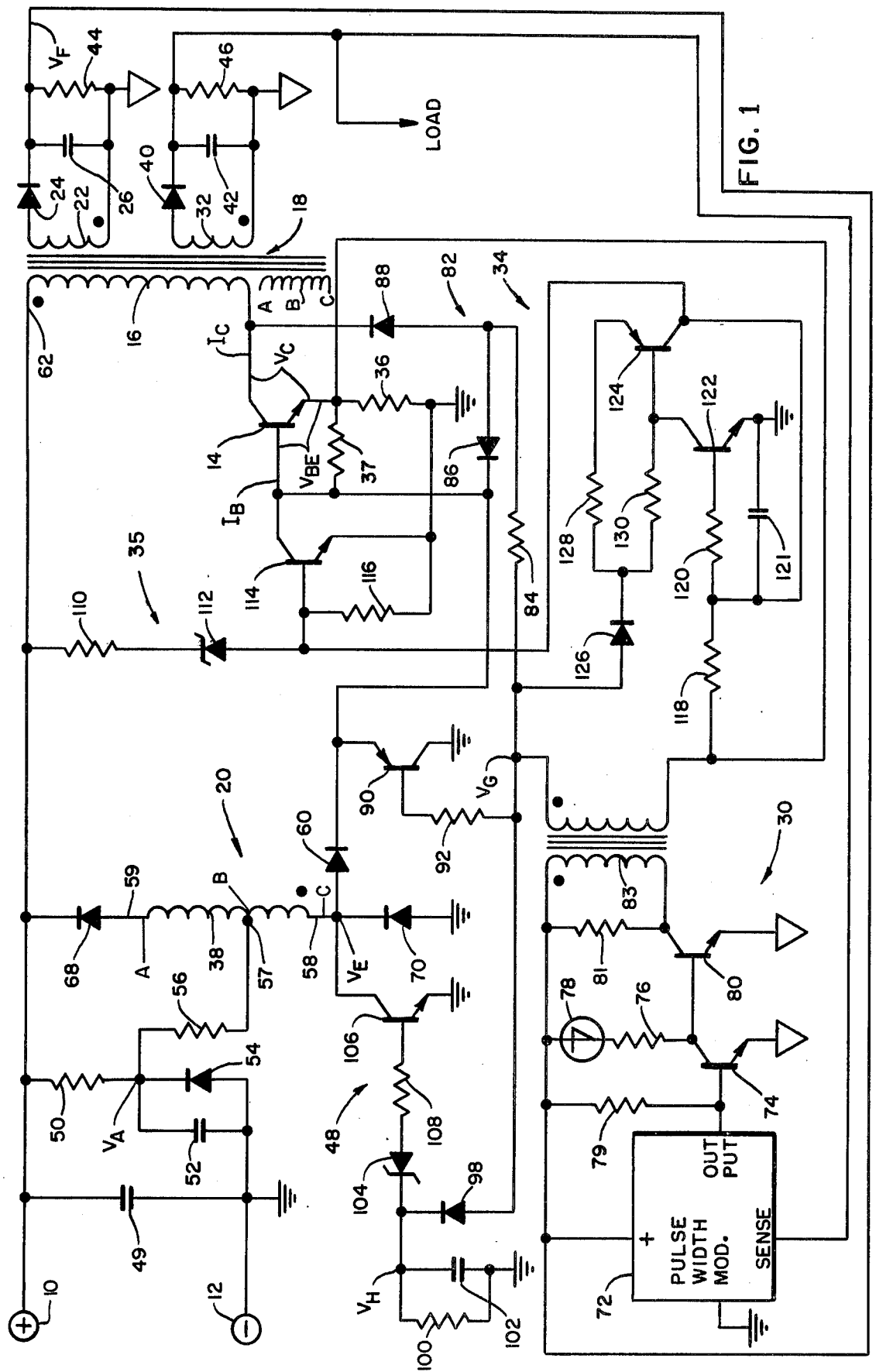
FIG. 1 is a schematic diagram of a direct current to direct current power converter including certain features of this invention.
Figure 2:
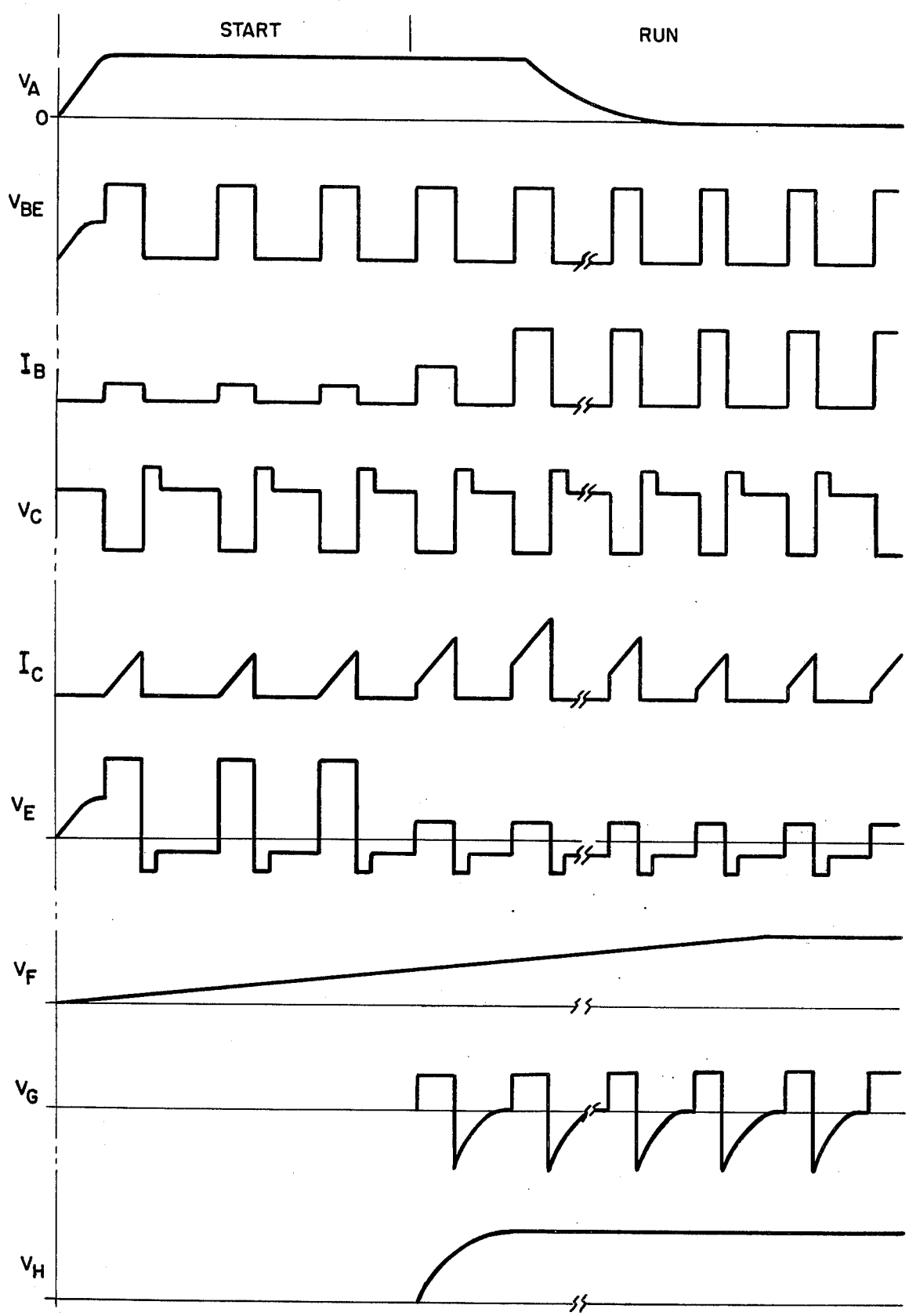
FIG. 2 is a graphical representation of selected signal levels of the apparatus of FIG. 1.

With reference to FIG. 1, a direct current power converter is illustrated which serves to switch, at a high frequency rate an incoming D.C. voltage fed to a pair of terminals 10 and 12. The incoming voltage level is thereafter shifted to the desired voltage level for rectification, filtering and, if necessary, regulation. As illustrated, the converter includes a power switching transistor 14 which switches the input current through a primary inductance in the form of a winding 16 of a multiwinding choke 18 at a high frequency rate. Upon the application of direct current to the input terminals 10 and 12, a starting circuit 20 initially causes the transistor 14 to go into a blocking oscillator operational mode interrupting the primary 16 winding current. The choke includes a secondary inductance 22 the output of which is rectified by a diode 24 and filtered by a capacitor 26 to provide a voltage level $V_F$ as illustrated in FIG. 2. When the voltage level $V_F$ across the capacitor is sufficient to adequately power a controlled duty cycle pulse generator 30, the starting circuit 20 is automatically disabled and the pulse generator 30 thereafter controls the switching of the transistor 14. The duty cycle of the pulse output of the generator 30 is responsive to a rectified voltage developed by a secondary winding 32 on the choke 18 which also provides power to an external load. In this way, a reasonably constant output voltage level is supplied to the load. Additionally, the converter includes a current overload protection circuit 34 which senses the current through the switching transistor 14 and in the event the transistor 14 draws excessive current it is momentarily switched off thus preventing possible damage to the transistor. Further, should an incoming voltage transient exceed a predetermined level, the transistor is switched off during the transient by a voltage transient protection means 35.

As illustrated, the collector switching transistor 14 is connected to one terminal of the primary winding 16 of the choke 18 with the emitter of the transistor 14 being passed through a low value current sensing resistor 36 to ground and a base return resistor 37 between the base and emitter of the transistor 14. The primary 16 is magnetically coupled to the secondary windings 22 and 32 and to a start winding 38 forming a component of the start circuit 20. It will be appreciated that any number of secondary windings may be provided to accommodate desired output voltage levels. Serving to closely couple the windings 16 and 38, the primary winding 16 is a bifilar wound with the start winding 38. The choke 18 windings are designated with relative polarities indicated by conventional dot notations. Each of the secondary windings are halfwave rectified with diodes 24 and 40 oriented for current flow in respective storage capacitors 26 and 42 during the off condition of the transistor 14 when the flux through the core of the choke 18 is falling. Correspondingly, when the dot end of the secondary windings is positive and the bottom end thereof negative, current will not flow in either of the secondary windings 22 and 32. A pair of bleeder resistors 44 and 46 are connected across each of the capacitors 26 and 42. As current passes through the primary winding 16, energy is stored in the core of the choke 16. Power is then transferred to the secondary windings 22 and 32 during the subsequent turn OFF of the transistor 14. To provide a low ripple content with relatively small capacitor 26 and 42 values, the transistor 14 is switched ON and OFF at a relatively high rate on the order of 20 kilohertz.

In response to the application of direct current at the input terminals 10 and 12, the starting circuit 20 serves to initiate switching of the transistor 14 which operates as a blocking oscillator. When the voltage across the capacitor 26 reaches a preselected level sufficient to provide operating power to the start circuit 20, the start circuit is switched off by a start circuit disabling means 48 and the pulse generator 30 controls the transistor 14 during normal operation.

START CIRCUIT

Upon application of D. C. voltage to the terminals 10 and 12, a capacitor 49 provides additional filtering of the input current. The start circuit 20 includes a series resistor 50 connected to a time delay capacitor 52. Serving to prevent a possible voltage polarity reversal which may damage the capacitor 52 is a parallel connected diode 54. The voltage across the capacitor 52 indicated as $V_A$ and illustrated in FIG. 2 is a fractional portion of the input voltage resulting from a voltage divider arrangement with a resistor 56 through the base of the switching transistor 14. The start winding 38 is tapped at 57(B) and the resistor 56 connected between this tap and the cathode of the diode 54. One terminal 58(C) of the start winding 38 is connected to the anode of a steering diode 60 and to the base of the switching transistor 14. Thus, the base voltage $V_{BE}$ (FIG. 2) of the switching transistor 14 will follow the voltage $V_A$ until $V_{BE}$ exceeds the threshold of the transistor at which time the current through the transistor collector $I_C$ increases and the dot end 62 of the primary winding 16 rises. Similarly, as a result of the heavy coupling between the windings 16 and 38 the voltage at the dot end 58 of the start winding 38 further increases $V_{BE}$ with the transistor rapidly saturating as by the collector voltage $V_C$ in FIG 2. It will be appreciated that the maximum collector current $I_C$ through the transistor 14 is determined by the gain ($h_{fe}$) of the transistor multiplied by the base current $I_B$ (FIG. 2). After saturation, the collector current $I_C$ continues to increase until the maximum saturation current ($h_{fe} \times I_B$) is reached at which time the collector-emitter potential $V_C$ of the transistor 14 starts to rise. The rise in $V_C$ is reflected back to the start winding 38 and the voltage $V_E$ at the end 58 of the winding 38 as well as $V_{BE}$ decrease rapidly turning OFF the transistor. Thus, upon the application of power, a regenerative feedback path drives the transistor 14 to saturation. The same feedback path is used to abruptly switch the transformer OFF with the transistor 14 functioning as a blocking oscillator. The slight overshoot at the leading edge of $V_C$ and the falling edge of $V_E$ as illustrated in FIG. 2 is the result of the non-coupled leakage between the two coils. That is, the leakage of the bifilar windings start 38 and primary 16 which is not coupled to the secondary windings 22 and 32 produces the voltage overshoot.

It will be appreciated that since both the base and the collector circuits of the transistor 14 include a relatively high series inductance, the current through the transistor both at the base $I_B$ and the collector $I_C$ will increase at a rate determined by the respective inductance values. As the current through the winding 16 builds up, the voltage drop thereacross increases and the positively increasing (dot) terminal 62 is reflected at the end 58 of the start winding 38 which results in an increase in base current $I_B$ of the transistor 14. This current increase allows greater collector current $I_C$ until transistor 14 saturation is quickly reached. During the ON state of the transistor 14, the remaining end 59(C) of the start winding is nonconductive due to the presence of a series diode 68. The cathode of the diode 68 is connected to the positive input terminal 10 and the anode thereof being connected to the end 59 of the start winding 38. When the transistor 14 switches OFF, the start winding is clamped to VCC through the diode 68 and the lower end of the winding is similarly clamped to ground through a diode 70 thus preventing the collector of the transistor 106 from being driven negative with respect to ground.

PULSE GENERATOR

The pulse generator 30 includes a pulse width modulator 72 which is of conventional construction. The operation of such a pulse width modulator is thoroughly described in *IEEE Transactions on Industry Applications*, Volume IA-8, No. 6, November/December 1972 at page 788 entitled "A Hybrid Integrated Pulse Width Modulator" by Hermann Fickenscher. A suitable pulse width modulator for use in the illustrated embodiment is manufactured by Western Electric Corporation having a product designation of 526A. When the rectified voltage of the secondary winding 22 reaches a predetermined value, the output of the pulse width modulator 70 is passed to the switching transistor 14 by applying power to the collector of an NPN switching transistor 74. The collector of the transistor 74 is connected through a load resistor 76 in series with a silicon unilateral switch (SUS) 78 to the rectified output of the secondary winding 22. The characteristics of the unilateral switch 78 are such that a predetermined voltage level is required to break down the switch junction after which the SUS exhibits an extremely low impedance and correspondingly a low voltage drop.

Additionally, the base of the transistor 74 is biased through a resistor 79 to the rectified secondary voltage $V_F$. As will be further considered, when the voltage $V_F$ exceeds the conduction voltage of the SUS 78, the SUS conducts allowing current to flow through the transistor under control of the output of the pulse width modulator 72. Although the characteristics of the pulse width modulator 72 are such that it will operate at relatively low voltage levels, the operational characteristics under such conditions are marginal. Thus, the SUS 78 effectively serves to switch the output of the pulse width modulator 72 to the switching transistor 14 after the voltage $V_F$ has reached a level sufficient to maintain reliable control of the pulse width modulator. Serving to amplify the pulsating output of the transistor 74 is a second NPN transistor 80. A resistor 81 is parallel connected with the primary of an isolation transformer 83 and this parallel combination is connected in a series with the collector of the transistor 80. The duty cycle of the output signal from the modulator varies in response to the rectified voltage level at the secondary winding 32 which additionally supplies an external load. Thus, the sense voltage to the pulse width modulator 72 exactly tracks the voltage supplied to the load.

Output voltage $V_G$ from the isolation transformer 83 drives the switching transistor 14 through a Baker clamp circuit 82 including a limiting resistor 84 and diodes 86 and 88. A Baker clamp is a well-known circuit which serves to insure that the switching transistor 14 is driven in the linear, high speed operational mode. That is to say, the transistor 14 is prevented from operating at full saturation which condition results in relatively slow switching speeds. Once the pulse generator 30 forces sufficient current into the base of the transistor 14, the collector voltage VC drops until the diode 88 becomes forward biased. The forward biased condition of the diode 88 shunts current away from the transistor base effectively raising VC and maintaining the transistor slightly above cutoff. This operation is in contrast with the operation of the switching transistor 14 hen operated as a blocking oscillator in the start mode during which the transistor 14 is driven to saturation.

During that portion of the operating cycle when both the start circuit 20 and pulse generator 30 are operative, the inputs to the transistor 14 are additive when $V_G$ is high and when $V_G$ is low the base of the switching transistor 14 is held low by means of a PNP base discharge transistor 90. The emitter of transistor 90 is connected directly to the base of the switching transistor 14. The base of the discharge transistor 90 is coupled through a resistor 92 to the output of the isolation transformer 83. During normal running operation, the transistor 90 serves to assure rapid turn off of transistor 14 by clamping the base of transistor 14 to ground. When transistor 80 is turned off, the magnetizing inductance of transformer 83 turns transistor 90 on. It will be noted that the pulse generator 30 and choke secondary circuits are direct current isolated from the remainder of the converter and from the input terminals 10 and 12 to the converter thus allowing the use of separate grounding systems for the power input and load.

START CIRCUIT DISABLING

Serving to disable the start circuit 20 is the start circuit disabling means 48 which is driven by the output $V_G$ from the pulse generator 30. The pulse generator 30 output $V_G$ is fed through a steering diode 98 to a parallel resistor 100 and capacitor 102 combination whereat the pulse energy is stored and represented by the voltage level $V_H$, illustrated in FIG. 2. During the initial pulse from the pulse generator 30, the voltage across the storage capacitor 102 reaches the break down voltage of a zener diode 104 which feeds the voltage level $V_H$ to the base of a transistor 106 through a current limiting resistor 108. Thus, after the first output pulse from the generator 30 the charge across the capacitor 102 is sufficient to break down the zener 104 saturating the base of the transistor 106. Upon saturation, the transistor 106 pulls the terminal 58 of the start winding 38 to ground disabling the starting circuit 20. The high output from the isolation transformer 83 is fed through the resistor 84 and diode 86 to the base of the switching transistor 14 driving the switching transistor ON. During the low state of $V_G$, the base discharge transistor 90 is biased ON and the low level of the emitter serves to drain any residual charge which may be stored on the transistor base thus assuring complete turn off of the transistor 14.

PROTECTION CIRCUITS

Serving to prevent the collector voltage from exceeding the ratings of the switching transistor 14 is the series combination of a limiting resistor 110 and zener diode 112 connected from the positive input terminal 10 to the base of an NPN transistor 114. The collector of the transistor 114 is connected to the base of the switching transistor 14. The emitter of the transistor 114 is grounded and the base provided with a return resistor 116. Thus, should the input power applied via the terminals 10 and 12 present a voltage transient exceeding the zener diode 112 rating, the transistor 114 will be biased ON pulling the base of the switching transistor 14 low which turns OFF the switching transistor for the duration of the transient.

As previously mentioned, the illustrated embodiment includes a current overload circuit 34 which serves to protect the output transistor 14 should any of the secondary windings 22 or 32 be overloaded or accidentally shorted. An overload condition on one of the secondaries will be coupled to the remaining winding and thus the sense voltage to the pulse width modulator 72 will decline regardless of which secondary is overloaded. In response to such a situation, the pulse width modulator 72 attempts to drive the switching transistor 14 ON for longer and longer periods of time until the maximum 50% duty cycle of the pulse width modulator 72 is reached. The increased average current flow through the transistor 14 is sensed by sampling the voltage across the emitter resistor 36 and fed through a pair of series limiting resistors 118 and 120 to the base of an NPN transistor 122 which in combination with a second PNP transistor 124 forms a latch. Serving to bypass short duration noise pulses and thus prevent accidental setting of the latch and turn OFF of the switching transistor 14 is a capacitor 126 connected between ground and the common connection of the limiting resistors 118 and 120. The collector of the NPN transistor is connected directly to the base of the PNP transistor 124 and to the cathode of a steering diode 126 through a resistor 128. The anode of the diode 126 is connected to the output $V_G$ of the pulse generator 30 and the collector of the transistor 122 is similarly coupled through a series resistor 130 to the cathode of the diode 126. When the voltage across the current sensing resistor 26 exceeds the breakdown voltage of the transistor 122, it turns ON which turns ON the PNP transistor 124. Turn-on of the transistor 124 raises the voltage on the collector thereof placing a positive voltage on the base of the transistor 122 thus latching both transistors in their ON state. So long as $V_G$ remains high, the transistors 122 and 124 will remain in their ON state. Thus, should excessive current be drawn by the switching transistor 14 during the positive going portion of the pulse generator 30 output, the latch sets with the transistor 114 saturating and the base of the switching transistor 14 pulled to ground. During the subsequent low state of $V_G$, the anode of the diode 126 goes low as does the collector of transistor 122 and the emitter of transistor 124 turning both transistors OFF resetting the latch.

Current limiting is obtained in the start mode of operation since the switching transistor 14 when operated as a blocking oscillator is self limiting. In the ON state of the switching transistor 14, the secondary diodes 24 and 40 are reversed biased and the switching transistor is effectively feeding a high impedance load. During the OFF state of the transistor 14, the overload condition of the secondary windings increases the time required for the current through the primary winding to decay $$(t = \frac{Ldi}{e}).$$

This situation reduces the start circuit operating frequency and thus the duty cycle of the transistor thereby preventing excessive heat dissipation.

OPERATION

Upon application of direct current to the terminals 10 and 12 of the converter, current flows through the series resistors 50 and 56, and the start winding 38 to the base of the switching transistor 14. Upon turn ON of the transistor 14, current flows through the primary winding 16 of the choke 18 and the mutual coupling between it and the start winding raises the voltage $V_E$ at the end 58 of the start winding further increasing the current through the transistor 14 base abruptly saturating the transistor. When the collector current $I_C$ reaches the maximum saturation current, $V_C$ start to rise which, due to the coupling between the primary winding and the start winding, produces a drop in the transistor base voltage. This decrease further increases $V_C$ correspondingly further decreasing $I_B$ and the transistor abruptly cuts off with the transistor acting as a blocking oscillator.

Upon turn OFF, the energy stored in the choke 18 is coupled to the secondary windings 22 and 32, rectified by the diodes 24 and 40 and filtered by the output capacitors 26 and 42. The voltage at the end 59 of the start winding 38 rises; however, it is clamped from rising above the positive input voltage by means of the diode 68. The dot end 58 of the start winding is similarly prevented from decreasing below ground potential by the diode 70. This condition is reflected to the collector of transistor 14 preventing the collector emitter voltage from exceeding twice the D.C. input voltage applied to terminals 10 and 12. The output capacitor 26 charges until a predetermined voltage is reached whereat the SUS 78 breaks down and the output of the pulse width modulator 72 is fed through the isolation transformer 83 and steering diode 98 to the disabling circuit 48. After the initial pulse from the generator 30, the voltage across the capacitor 102 reaches a value sufficient to break down the zener diode 104 thus passing current to the base of the transistor 106. Saturation of the transistor 106 draws its collector low, pulling the terminal 58 of the start winding 38 to ground and effectively disabling the start circuit 20 for the duration of the operation. After the start circuit 20 is disabled, the switching transistor 14 is controlled by the pulse output from the pulse generator 30 which is fed through the diode 86 into the base of the transistor. The duty cycle of the pulse-width-modulator 72 is inversely porportional to the voltage supplied to the load and in this manner, the duty cycle of the switching transistor in its ON condition is increased as the load voltage drops. This condition increases the amount of energy stored in the core of the choke 72 and correspondingly the amount of energy coupled to the secondary windings 22 and 32 during the OFF state of the transistor 14.

As previously mentioned, incoming voltage transients which exceed the breakdown voltage of the zener diode 112 are coupled to the base of the switching transistor 14 turning it OFF in the presence of the transient. Serving to prevent excessive current through the transistor is the DC latch 34 which responds to excessive current flow through the emitter resistor 36 of the switching transistor 14. In the set state of the latch, positive bias is applied to the transistor 114 which turns OFF the switching transistor 14. In response to the subsequent low level of $V_G$, the latch 34 is reset. Thus, the transistor 14 parameters may be determined by normal operating conditions rather than voltage transient or abnormal overload situations.

A D.C. to D.C. converter has been described for converting a first direct current level to a second direct current level. Although the invention has been particularly shown and described with reference to a single preferred embodiment thereof, it should be understood that various changes in form and detail may be made without departing from the spirit and scope of the invention.

What is claimed is:

1. An apparatus for converting a direct current input voltage level to a preselected direct current output level including a start circuit for initiating operation of the apparatus upon the application of the direct current input comprising:

a choke having a primary inductance, a start inductance and at least one secondary inductance, said primary, start and secondary inductances being magnetically coupled, a first switching means having a control terminal for intermittently switching the direct current input through said primary inductance, said start circuit including means for passing at least a portion of said direct current input to the control terminal of said first switching means, and means for passing at least a portion of the voltage across said start inductance to said control terminal of said switching means so that the rate of voltage change across said primary inductance created by the switching of current therethrough by said first switching means is reflected across said start inductance and to the control terminal of said switching means thereby causing said switching means to intermittently interrupt the input current through said primary inductance;

means for rectifying the varying voltage induced across said secondary inductance by the current passing through said primary inductance to provide said selected direct current output level;

a pulse generator responsive to the voltage across said secondary inductance and serving to provide a pulsed signal to the control terminal of said switching means in response to a predetermined level of said rectified secondary voltage; and means for disabling said start circuit in response to the output of said pulse generator so that said start circuit controls said switching means upon the initial application of said direct current input and said pulse generator serves to control subsequent operation of said switching means.

2. The apparatus of claim 1 wherein said switching means is in the form of a transistor with the base of the transistor corresponding to said control terminal and said pulse generator includes a pulse width modulator, the duty cycle of the pulse width modulator being determined by the voltage across said secondary inductance, said generator further including second switching means for switching the output of said pulse width modulator to the base of said switching transistor said switching means being responsive to said secondary voltage.

3. The apparatus of claim 2 wherein said input direct current passed to the base of said switching transistor is coupled through at least a portion of said start inductance to the base of said switching transistor.

4. The apparatus of claim 3 wherein a first end of said start inductance is coupled to said transistor base through a steering diode and said disabling means includes means for shorting said first end of said start inductance in response to the output signal from said pulse generator.

5. The apparatus of claim 2 wherein said second switching means includes a silicon unilateral switch responsive to said rectified secondary voltage and serving to allow application of the output of said pulse width modulator to said switching transistor when said rectified secondary voltage reaches a predetermined level.

6. The apparatus of claim 2 which further includes means responsive to a predetermined current level through said transistor for turning off the switching transistor in response thereto so as to prevent the conduction of excessive current through the transistor.

7. The apparatus of claim 6 wherein said current protection means includes a latch attaining a set state in response to said current overload condition and a reset state in response to a predetermined signal from said pulse generator whereby said latch serves to interrupt the current through said transistor in response to a current overload and resets in response to an output signal from said pulse generator.

8. The apparatus of claim 6 which further includes means responsive to the input voltage for turning off said transistor when the input voltage exceeds a predetermined level so as to protect said switching transistor from potentially destructive voltage transients.

9. The apparatus of claim 6 which additionally includes an isolation transformer coupling the output of the said pulse generator to the base of said transistor, said isolation transformer serving to provide direct current isolation between the input voltage and the direct current output voltage.

10. A method for converting a direct current at a first voltage level to a second predetermined direct current voltage level comprising the steps of:

initially interrupting the input current through a primary inductance of a choke having a start inductance and a secondary inductance, so that the voltage is induced in said start inductance which initially controls the interruption of current through said primary inductance;

rectifying the voltage across the secondary inductance;

generating a pulsed signal related to the rectified output voltage from the secondary inductance;

subsequently controlling the rate of current flow through said primary inductance with said pulsed signal when the rectified secondary voltage reaches a predetermined level;

sensing the current flow through the primary inductance;

interrupting the current flow therethrough when the current reaches a predetermined level and allowing current to commence flowing after said interruption in response to said pulsed signal; and preventing the interruption of current through said primary inductance by the voltage induced in said start inductance when said rectified voltage level reaches said predetermined level.

11. The method of claim 10 which further comprises the step of varying the duty cycle of said pulsed signal in relation to said rectified secondary voltage so as to control the duration of current flow through said primary inductance.

* * * * *